July 12, 1955  W. FEW  2,713,137
ELECTRIC REGULATION BY CONTROLLED REVERSIBLE MOTOR
Filed Oct. 31, 1949

INVENTOR.
William Few
BY Harry R. Canfield
ATTORNEY

United States Patent Office 2,713,137
Patented July 12, 1955

2,713,137

ELECTRIC REGULATION BY CONTROLLED REVERSIBLE MOTOR

William Few, Cleveland Heights, Ohio, assignor to The Clark Controller Company, Cleveland, Ohio, a corporation of Ohio Application October 31, 1949, Serial No. 124,689

9 Claims. (Cl. 318—298)

This invention relates to electrical systems of the general class in which some condition or quantity which tends to vary is regulated or maintained constant or at a preselected value.

More particularly, the invention relates to systems of this class in which an electric motor is driven forward or in reverse or comes to rest to effect the regulation, and in response to the tendency of the regulated condition or quantity to vary.

As will become apparent hereinafter, the invention is applicable to various uses in various arts but in order to disclose the invention by a concrete embodiment, I have chosen to illustrate and describe it herein as applied to the controlling or regulating of the conditions at an electric arc between electrodes, by moving one of the electrodes toward or from the other by motor power in response to variations of potential across the arc, to maintain the potential and the performance of the arc, constant; and I have chosen, furthermore, for illustration purposes, the regulation of the arc as utilized in the so-called "hot topping" process employed in steel manufacture, wherein the heat of the arc is applied to the top of an ingot while cooling in the ingot mold, to prevent well known losses that result from uncontrolled cooling and shrinkage.

In this embodiment of the invention, the motor for moving the movable electrode is a motor with opposed or differentially wound fields; and the relative energization of the fields is caused to respond to variations in the potential across the arc; and one field is energized to predominate over the other, or the other over the one, to cause the motor to run in forward or reverse direction respectively to raise or lower the electrode; upon deviations of arc voltage from a preselected value and to restore the arc voltage to that value; and the energization of the two fields is equalized or balanced to hold the motor without movement, when the preselected value is present at the arc.

Regulation of arc conditions, by means of a motor having differential fields, as mentioned above has, generally speaking, been proposed heretofore. But in all prior regulating controls of this type of which I am aware, the response of the motor to arc condition changes has not been sensitive enough for the requirements of some arc-electrode installations, and particularly not for the hot-topping process referred to.

This insensitivity, in such prior controls, is due to the fact that when a slight change of arc condition occurs, the change of current supplied to the motor and its fields is also a very slight change, and is not enough to immediately start the motor and give it sufficient power to move the electrodes to an arc condition correcting position.

Amplification of the changes of current supplied to the motor is therefore indicated, but known or obvious amplifiers would involve complications, for example electronic tube amplifiers and their control circuits, and such apparatus is not desirable in the steel mill environment where the hot topping process is performed.

Furthermore, in the differential motor field type of control here being considered, the maximum sensitivity of the motor response calls for an increase of current to one field and concurrently a decrease of current to the other field.

In prior controls comprising a differential-field type of arc-electrode motor, when attempts have been made to increase the strength of one field and decrease that of the other, one field has been energized in correspondence with voltage across the arc and the other in response to current in the arc, for the obvious reason that the arc current decreases as the arc voltage increases and vice versa. Any obvious means to magnify or multiply both the increase of one field and the decrease of the other in response to changes of arc voltage and current, introduces still more complications.

According to the present invention, and speaking generally, the actual invention being that set forth in the appended claims, an arc-electrode motor of the differential field type is supplied with current through the motor armature and through both field windings, normally balancing the fields thereby causing the motor to be normally at rest.

In the operation of the control, one field is made stronger and the other weaker in response to a change of voltage alone at the arc, and the motor moves the electrode to restore the arc voltage.

The current to the motor is supplied from alternating current mains, and is rectified by two full wave rectifiers, one for each field winding.

Saturable reactors are provided comprising inductor windings through which the rectified current flows, and saturating direct current windings associated with the inductor windings; the arrangement being a magnetic amplifier of great amplification ratio, sometimes referred to as a Transductor.

The amount of rectified current flowing to the fields is controlled by the saturating windings as follows: If there is no saturating current, the fields are balanced. If saturating current flows in one direction, one field winding receives increased current and the other decreased current, and if the saturating current flows in the other direction, the other field receives increased current and the one receives decreased current, and in either case unbalancing the fields and causing the motor to run and move the arc-electrode.

The association of the saturating direct current windings and the inductor windings energized by the rectified current constitutes an amplifier of great amplifying ratio; and the said increase of current to one field, and the said decrease of the current to the other field are both greatly magnified, whereby the motor not only receives greatly amplified current in the absolute sense, for a small change of saturating current, but also the difference between the two fields or the preponderance of one over the other is augmented, whereby for a very small saturating current, the power developed at the motor to move the arc-electrode is doubly magnified.

The saturating current is provided as follows:

A variable unidirectional potential is derived from the voltage across the arc, and is opposed by a fixed preset reference potential; and the difference between the two is the actuating potential that energizes the saturating winding, and as will become apparent, the actuating potential will be of zero value and no saturating current will flow when the variable arc potential is at a preselected value (determined by the preset reference potential) and will flow in one direction or the other as the arc potential deviates above or below the preselected value.

Means is also provided by which actuating current in either direction may be caused to flow under manual control, whereby raising or lowering of the arc electrode can be effected manually.

The fields of the motor are inductive and tend to discharge periodically in a manner to tend to disturb or interfere with the amplification function of the saturating windings, and means is provided to overcome this tendency.

It is among the objects of the invention to provide in connection with an arc-electrode-moving motor, a control rendering the motor immediately responsive with great power, to small variations of potential at the arc.

To provide in connection with an arc-electrode-moving motor of the differential field type, an improved control which supplies current to the fields differentially, and which is actuated by a very small variable actuating current derived from the arc potential, and at a great amplification ratio as between the actuating current and the supplied current.

To provide a control as referred to above, and in which upon a change of actuating current effected by a change of arc potential, the current supplied to one field is increased by a great amplification ratio; and that to the other is decreased by a like ratio, whereby the preponderance of one field over the other is doubly magnified.

To provide a control having the improved characteristics referred to in which the amplification of the current to the fields is effected by a magnetic amplifier in an improved manner.

To provide a control as referred to in which the current to the motor and its fields is supplied through a rectifying system from an alternating current supply in an improved manner.

To provide a control as referred to in which rectified current to the motor and differential fields thereof is supplied through a rectifier system comprising rectifiers in series with inductor windings of saturable reactors; and in which unidirectional current saturating windings control the amperage to the motor and fields and also effect amplification thereof whereby a small change of saturating current such for example as may be derived from the voltage across an electrode arc produces an enormous differential effect by the motor fields, giving the motor great power to move the electrode in an arc voltage correcting direction.

To provide a control having the characteristics of the preceding objects, applicable to electrical loads generally as well as to loads comprising a motor and differential fields.

To provide a control as referred to above for supplying current to a load through rectifiers in series with inductor windings of saturable reactors, and having means to prevent the discharge of the inductance of the load from sustaining the rectified current in the inductor windings as the current passes periodically through zero value.

To provide a control of the general type referred to hereinbefore comprising unidirectional saturable reactor windings in which the current is caused to flow in one direction or the other by the potential difference between a constant reference voltage and a varying potential; and in which, when desired, the direction of the current may be caused to change manually independently of the varying potential.

Other objects will be apparent to those skilled in the art to which the invention appertains.

The invention is fully disclosed in the following description taken in connection with the accompanying drawing, in which.

Figures 1, 2:
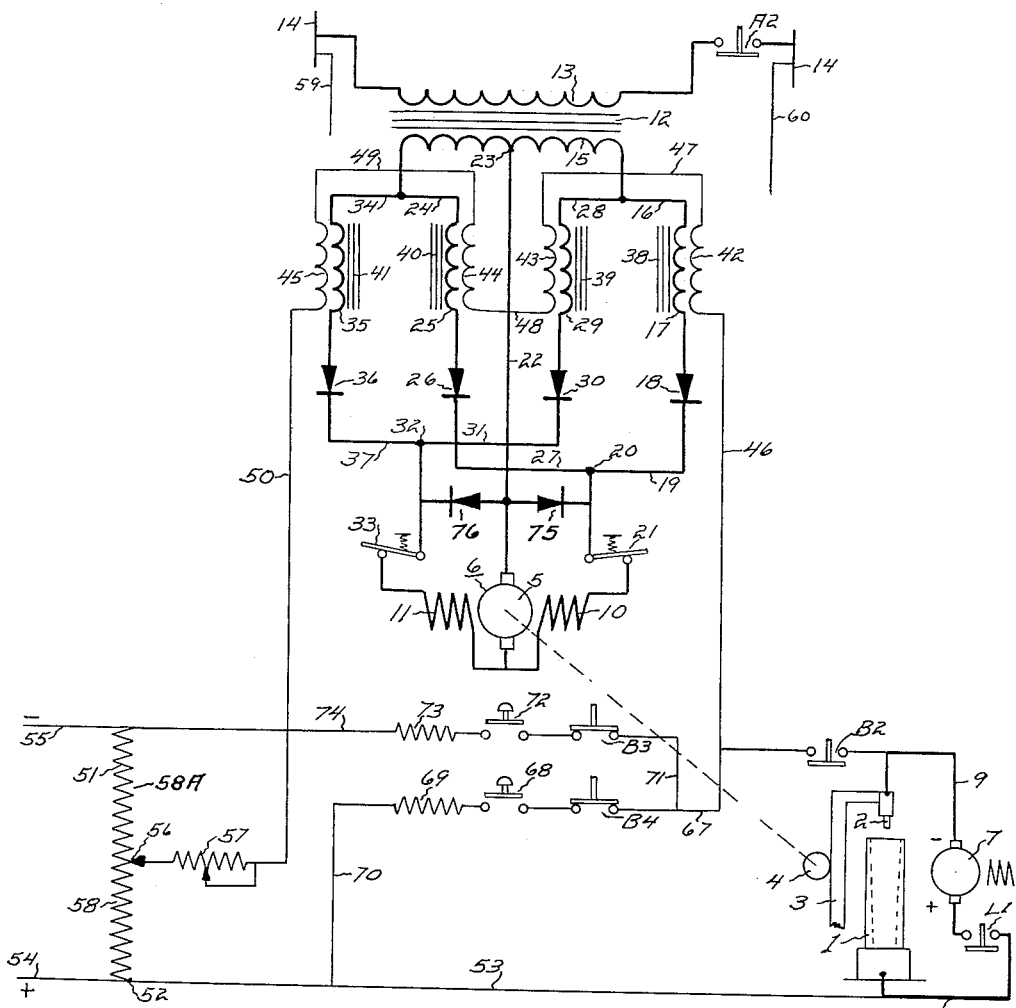
Fig. 1 is a diagrammatic view illustrating the invention and its adaptation to the hot topping process referred to hereinbefore.
Fig. 2 is an across-the-line type of diagrammatic view illustrating certain controls by which the system of Fig. 1 may be operated.

Contacts of electromagnetic contactors of Fig. 2 are reproduced separately from the contactors in other parts of Figs. 1 and 2 to simplify the drawing and avoid complications of wiring connections.

Referring to the drawing, there is shown at 1 in simplified form an ingot-containing mold and, above the top of the ingot in the mold, an arc electrode 2 spaced therefrom for clearness. The arc itself and the usual flux blanket submerging the end of the electrode are omitted for clearness.

The electrode 2 is carried by a vertically reciprocable support 3, propelled upwardly or downwardly to raise or lower the electrode 2 by a mechanism represented by a wheel 4.

The wheel 4 is rotatably driven by being connected to the rotary armature 5 of a reversible direct current type of motor, indicated generally at 6.

Current for the arc at the electrode 2 is provided by a direct current generator 7, having the polarity indicated, a positive lead 8 from the generator being connected to the ingot mold 1, and a negative lead 9 being connected to the electrode 2, a part of the lead 9 being flexible for movement of the electrode.

The motor 6 has two differentially wound fields 10—11 each in series with the armature 5; one when energized tending to cause the armature 5 to rotate in one direction, and the other in the other direction, whereby when they are equally energized or their energizations are balanced, the armature 5 remains at rest; and when the energization of one predominates over that of the other the armature rotates in a corresponding direction.

Unidirectional current is supplied to the fields 10—11 and armature 5 as follows.

A transformer 12 has a primary winding 13 suitable to be connected to 110 volt A. C. mains 14—14.

A bi-phase secondary 15 energizes two full wave rectifier networks, one for each of the fields 10—11.

The circuits for the field 10 are as follows. From the right end of the secondary 15 by wire 16, through an inductor winding 17, thence through a rectifier 18, by wire 19, to point 20, thence through a limit switch 21, through field 10 and armature 5, by wire 22, to midpoint 23 of the secondary 15; and from the left end of secondary 15, by wire 24, through an inductor winding 25, through a rectifier 26, by wire 27 to point 20, and so on as before.

The circuits for the field 11 are as follows. From the right end of the secondary 15 by wire 28, through an inductor winding 29, rectifier 30, wire 31 to point 32, thence through a limit switch 33, through field 11 and armature 5 by wire 22 to the secondary mid-point 23; and from the left end of the bi-phase secondary 15 by wire 34 through an inductor winding 35, a rectifier 36 and wire 37 to point 32 and so on as before.

The inductor windings 17, 29, 25, and 35 are wound on iron cores, indicated at 38, 39, 40, and 41 respectively; and saturating windings 42, 43, 44, and 45 are also wound on the cores respectively.

The rectifying action causes half waves of the alternating current to flow in each inductor winding and always in the same direction, and as indicated by the arrangement of the conventionally illustrated rectifiers, this direction may be considered downward in each inductor winding.

The rectifiers 18—26 and 30—36 are preferably of the metal rectifier class one such being identifiable as copper oxide rectifier. Any suitable rectifier however may be utilized.

First, considering the saturating windings 42 to 45 as not energized, the inductor windings and cores act as reactors with unidirectional flux always in the cores; and they are designed with a suitable number of turns, to keep the flux well below the saturation value and to normally allow only a predetermined value of current to flow, which may be referred to as an intermediate current value.

This intermediate value of unidirectional current normally energizes the fields 10—11 so that they are balanced and the motor remains at rest.

The saturating windings 42 to 45 are all connected in a series circuit comprising a main 46, the winding 42, a wire 47, the winding 43, a wire 48, the winding 44, a wire 49, the winding 45, and a main 50.

The saturating windings 42 to 45 are wound in such direction relative to that of the windings 17, 29, 25, and 35 with which they are associated, that if current flows in the series circuit from main 46 to main 50, the windings 42 and 44 will produce magnetomotive force in the same direction as that of the windings 17 and 25, and the windings 43 and 45 will produce magnetomotive force in opposition to that of the windings 29 and 35.

If therefore it be considered that direct current flows in the series circuit in the direction from main 46 to main 50, the flux in cores 38 and 40 will be increased and the flux in cores 39 and 41 will be decreased, and the known action of saturable reactors will result, that is, the current through inductor windings 17 and 25 will increase and that in inductor windings 29 and 35 will decrease.

This will increase the energization of field 10 and decrease the energization of field 11 and cause the motor armature 5 to rotate in a corresponding direction due to the preponderance of field 10.

And similarly if current flows in the direction from main 50 to main 46, the field 11 will predominate and the armature 5 will rotate in the other direction.

With the arrangement illustrated, of an inductor winding, as at 17, and a direct current saturating winding, as at 42, on a core as at 38, and with alternating potential impressed on the inductor winding, and with a rectifier as at 18 in series with the inductor winding, a predetermined unidirectional current will flow in the inductor winding when the saturable winding is not energized; and it is known that a small unidirectional current in the winding 42 in the same direction as that in the winding 17 will cause a great increase in the current in the reactor winding 17. The arrangement is known as a magnetic amplifier, sometimes called a Transductor, and the amplification ratio is very great.

Similarly, a small current in say the saturating winding 43 assisting the winding 29 will cause a very great reduction in the current in the winding 29.

When therefore such a rectifier and amplifier is utilized in connection with a differential field motor as above described, the motor will respond very sensitively to current in the mains 46—50; a very small current in the mains will produce, by amplification, a very great preponderance of one field, 10 or 11, over the other, by making one very much stronger and the other very much weaker.

In the embodiment of the invention herein considered, unidirectional current in the mains 46—50 is provided by the following means, to be at zero value when the arc on the electrode 2 is as wanted and the voltage across the arc is therefore at a predetermined desired value; and to flow from the main 46 to the main 50 when the arc voltage rises above the predetermined value, and to flow from the main 50 to the main 46 when it falls below said value, to correspondingly cause the motor 6 to turn the wheel 4 and move the electrode 2 to a position at which the arc voltage is restored to the predetermined value at which again the current in the mains 46—50 returns to zero and the motor 6 comes to rest.

A voltage divider 51 has one end point 52 connected by a wire 53 to the generator lead 8 and is therefore positive. A source of unidirectional potential represented by positive and negative mains 54—55 respectively is connected across the whole voltage divider 51. This source may be arranged for in any suitable manner not deemed necessary to be illustrated, and may, for example, be the output voltage of the exciter for the generator 7, and a suitable potential will be 115 volts.

The said main 50 is connected to an adjustable point 56 on the voltage divider (through an adjustable resistor 57 to be referred to). The main 46 is connected to the generator lead 9 and therefore to the electrode 2 (through a contactor B2 to be referred to).

A suitable voltage at the arc is, as an example, 40 volts. The point 56 is adjusted along the voltage divider until the drop in the part 58 of the voltage divider between the points 52 and 56 is 40 volts.

The said mains 46—50 are thus subjected to two opposing potentials, that of 40 volts between the points 52—56 and that at the arc; and when the arc is in correct condition and has a voltage drop of 40 volts across it, the mains 46—50 are not energized, with the results described above.

If the arc voltage increases, above 40 volts, current flows in the circuit from the main 46 to the main 50; and if the arc voltage decreases below 40 volts, current flows in the said circuit from the main 50 to the main 46; with the results above described; in either case, causing the motor to move the electrode 2 to restore 40 volts at the arc.

The sensitivity of the response to the arc voltage change can be adjusted by adjusting the resistor 57, which changes the amount of arc voltage change necessary to cause a change in the saturating windings 42 to 45 sufficient to start the motor 6 as will be understood.

Obviously, if an arc voltage other than 40 is selected as the voltage to be maintained by the regulation, the point 56 would be preset at a different point on the voltage divider.

The two voltages, that at the arc and that of the drop in the part 58 of the voltage divider, may be referred to as balanced against each other, or the voltage drop in the part 58 of the divider may be referred to as a preset reference voltage.

The system of Fig. 1 is shown with certain switch contacts in the normal or off position, as when the apparatus is not working.

In Fig. 2 is illustrated an operator's control for putting the system into or out of operation.

Control mains 59—60, connected to the alternating supply mains 14—14 respectively, are shown fragmentarily in Fig. 1, and are reproduced in Fig. 2.

Across the mains 59—60 in Fig. 2 is a circuit comprising a start push button 62, a stop push button 63, and the winding 64 of a contactor A. When the start push button 62 is operated, normally open contacts A1 and A2 of the contactor A close. Contacts A1 reproduced near the push button 62 close a holding circuit for the winding 64, which then remains operated after the push button 62 is released.

Contacts A2 of the contactor A are reproduced at the top of Fig. 1 and close the circuit to the transformer primary 13.

Closure of start push button 62 also, by way of a normally closed manual switch S, energizes the winding 65 of a contactor B which operates and closes normally open contacts B1 and B2 and opens normally closed contacts B3 and B4, the contactor being maintained operated by the contacts A1, when the push button is released.

Contacts B1 reproduced in the lower part of Fig. 2, when closed, energize the winding 66 of a contactor L and it operates closing normally open contacts L1. These contacts are reproduced in the lead 8 of Fig. 1 of the generator 7 and close its load circuit.

Contacts B2 are reproduced in Fig. 1 and when they close they close the circuit of the mains 46—50.

Contacts B3 and B4 to be referred to, open at this time and are reproduced in Fig. 1.

Thus upon closing start push button 62, the line to the transformer primary is closed at A2; the circuit of the generator 7 is closed at L1; the saturating winding circuit between mains 50—46 is closed at B2; and the regulating system goes into operation as described.

When the stop push button 63 is operated to open its contacts, the whole system is restored to off condition as will be understood.

Means is provided as follows, operable by an operator to effect manual raising or lowering of the electrode 2 whenever that is desirable for example preparatory to starting up the system. This is done by manually energizing the mains 46—50. First of all the manual switch S is opened. This restores contactor B and closes contacts B3 and B4 and opens contacts B1 and B2. Contacts B1 upon opening effect opening of contacts L1 which takes the positive potential of the generator 7 off of the line 53, and contacts B2 upon opening take the negative potential and arc potential off of the main 46. Contactor A is then operated by start push button 62 if not already operated, and its contacts A2 close the transformer primary circuit.

A circuit is provided comprising a wire 67 connected to the main 46, the said closed contacts B4, a lowering push button 68, a current limiting resistance unit 69, and a wire 70 connected to the positive wire 53 and therefore to the point 52 of the voltage divider.

When the operator closes the push button switch 68, the mains 46—50 are subjected to the full 40 volt potential of the part 58 of the voltage divider as will be apparent and the circuit between the mains 46—50 is energized in the same sense as it would be during automatic operation upon the occurrence of a higher than normal voltage at the arc electrode 2, and the motor 6 is therefore operated to lower the electrode 2.

A circuit is provided comprising a wire 71 connected to the wire 67 and therefore to the main 46, the said closed contacts B3, a push button 72, a current limiting resistor 73 and a wire 74 connected to the upper end of the voltage divider 51.

When the operator closes the push button switch 72, the mains 50—46 are subjected to the full potential of the upper part 58A of the voltage divider as will be apparent and the circuit between the mains 50—46 is energized in the same sense as it would be during automatic operation upon the occurrence of a lower than normal potential at the arc, and therefore the motor is operated to raise the electrode 2.

As described above, the load that is supplied with rectified current through the inductor windings, is the motor field or fields and armature and this load is inductive. Each time that the rectified current falls to the zero point of the alternating current wave, this inductive load discharges, in a well known manner, and tends to maintain the flow of current in the inductor windings, and this delays the decay of the unidirectional flux in the cores. It has been found that this interferes with the above described action of the saturating windings, by taking full control of saturation away from them.

In order to eliminate this disadvantage, I provide rectifiers 75 and 76 in Fig. 1. The rectifier 75 provides a one direction closed path for the discharge of field 10, through the armature 5, through rectifier 75, and switch 21. The rectifier 76 provides a like discharge circuit for the field 11.

The switches 21 and 33 are limit switches in the motor field circuits and can be opened mechanically by any suitable means not shown associated with the frame element 3 carrying the electrode 2 to prevent overtravel of the electrode in either direction. Such overtravel might be caused by operation of the push buttons 72 and 68 to manually cause the electrode to be raised or lowered.

The invention as hereinbefore disclosed is susceptible of changes and modifications without departing from the spirit of the invention or affecting the disclosed end results thereof and the invention comprehends all such changes and modifications which may be made that come within the scope of the appended claims.

I claim:

1. A control for a motor having a pair of differentially acting field windings, comprising: a source of alternating current; two full wave rectifier systems energized from the source; each system comprising two rectifiers for half wave rectification respectively; and an inductor winding in series with each rectifier; and the systems respectively supplying full wave rectified current to the fields respectively, normally at intermediate balanced values of current at which the motor remains at rest; four saturating windings, two for each system, associated with the inductor windings respectively; a circuit comprising unidirectional current mains and connections between the mains which, when the mains are energized, energize all of the saturating windings, concurrently, and those of one system with current in the direction to assist the magnetomotive force of the inductor windings thereof, and those of the other system in the direction to oppose the magnetomotive force of the inductor windings thereof; to cause the current to one field to be increased and that to the other field to be decreased, to cause the motor to run in the direction determined by the predominating field; a control system comprising means producing a first unidirectional potential of preselected fixed value and impressing it on one of said mains; means producing a second unidirectional potential that varies through a range of values above and below that of the first potential and impressing it on the other mains in opposition to the first potential; to cause the current in the said circuit and mains to be at zero value when the two potentials are balanced one against the other to cause the motor to remain at rest as aforesaid, or to cause the current in the mains and circuit to flow in one direction or the other to cause one field or the other to predominate and cause the motor to run in one direction or the other, as the variable potential varies.

2. A control for an arc-electrode feed motor that has differentially acting fields that cause the motor to feed the electrode in one direction or the other as one field is caused to predominate over the other to always restore the arc voltage to a predetermined value as it tends to vary and deviate from said value; a source of alternating current; two full wave rectifier systems energized from the source; each system comprising two rectifiers for half wave rectification respectively; an inductor winding in series with each rectifier; and the systems respectively supplying full wave rectified current to the fields respectively, normally at intermediate balanced value of current at which the motor remains at rest; four saturating windings, two for each system, associated with the inductor windings respectively; a circuit comprising unidirectional current mains and connections between the mains which, when the mains are energized, energize all of the saturating windings, concurrently, and those of one system with current in the direction to assist the magnetomotive force of the inductor windings thereof, and those of the other system in the direction to oppose the magnetomotive force of the inductor windings thereof; to cause the current to one field to be increased and that to the other field to be decreased, to cause the motor to run in the direction determined by the predominating field; a control system comprising a source of unidirectional potential and means deriving a reference potential therefrom at preselected fixed value and impressing it on one of said mains; connections impressing the variable arc potential upon the other of said mains in opposition to the reference potential; to cause current in the said circuit and mains to be at zero value when the arc potential is at a predetermined desired value and is balanced by the reference potential, to cause the motor to remain at rest as aforesaid, and to cause the current in the mains and circuit to flow in one direction or the other to cause one field or the other to predominate and cause the motor to run in one direction or the other, as the arc voltage varies.

3. The control described in claim 2 and in which circuit means is provided for impressing potential on the mains, independently of the arc voltage, and manually operable contactor means is provided to cause the current in the mains and circuit resulting therefrom to flow in one direction or the other optionally.

4. A control for the current to an electric load comprising: a source of alternating current; a full wave rectifier system energized from the source, comprising two rectifiers for half wave rectification respectively and an inductor winding in series with each rectifier for supplying full wave rectified current at an intermediate value to the load; two saturating windings associated with the inductor windings respectively; a circuit comprising unidirectional current mains and connections therefrom which, when the mains are energized, energize both saturating windings concurrently and in the direction to assist the magnetomotive force of the inductor windings for current in the mains in one direction and oppose it for current in the mains in the other direction; a control system comprising means for producing a unidirectional reference potential at preselected fixed value and impressing it on one of said mains, and comprising a source of variable unidirectional potential and impressing it on the other of said mains in opposition to the reference potential, to cause current in said circuit and mains to vary to cause the current in the load to vary as the variable potential varies.

5. The control described in claim 4 and in which discharge of the load due to its inductance at zero values of the rectified current is prevented from sustaining current in the inductor windings, by a loop around the load containing a rectifier which passes current only in the discharge direction.

6. A control for varying relatively the current in two respective electric loads comprising: a source of alternating current; two full wave rectifier systems energized from the source; each system comprising two rectifiers for half wave rectification respectively; and an inductor winding in series with each rectifier; and the systems respectively supplying full wave rectified current to the loads respectively, normally at intermediate values of current; four saturating windings, two for each system, associated with the inductor windings respectively; a circuit comprising unidirectional current mains and connections between the mains which, when the mains are energized, energize all of the saturating windings, concurrently, and those of one system with current in the direction to assist the magnetomotive force of the inductor windings thereof, and those of the other system in the direction to oppose the magnetomotive force of the inductor windings thereof; to cause the current to one load to be increased and that to the other load to be decreased; a control system comprising means producing a unidirectional reference potential of preselected fixed value and impressing it on one of said mains; means producing a second unidirectional potential that varies through a range of values above and below that of the reference potential and impressing it on the other mains in opposition to the reference potential; to cause the current in the said circuit and mains to be at zero value when the two potentials are balanced one against the other to cause the loads to receive normal current as aforesaid, or to cause the current in the mains and circuit to flow in one direction or the other to cause the current in one load or the other to predominate as the variable potential varies.

7. A control for a motor having a pair of differentially acting field windings, comprising: a source of alternating current; two full wave rectifier systems energized from the source; each system comprising two rectifiers for half wave rectification respectively; and an inductor winding in series with each rectifier; and the systems respectively supplying full wave rectified current to the fields respectively, normally at intermediate balanced values of current at which the motor remains at rest; four saturating windings, two for each system, associated with the inductor windings respectively; a circuit comprising unidirectional current mains and connections between the mains which, when the mains are energized, energize all of the saturating windings, concurrently, and those of one system with current in the direction to assist the magnetomotive force of the inductor windings thereof, and those of the other system in the direction to oppose the magnetomotive force of the inductor windings thereof; to cause the current to one field to be increased and that to the other field to be decreased, to cause the motor to run in the direction determined by the predominating field; a control system for supplying unidirectional current to the said mains either at zero value to cause the motor to remain at rest as aforesaid, or in one direction or the other to cause one field or the other to predominate and cause the motor to run in one direction or the other; means to prevent discharge of the fields due to their inductance from sustaining current in the inductor windings comprising a loop around each field containing a rectifier which passes current only in the discharging direction.

8. The control described in claim 1 and in which circuit means is provided for impressing potential on the mains independently of the potential that varies, and manually operable contactor means is provided to cause the current in the mains and circuit resulting therefrom to flow in one direction or the other optionally.

9. The control described in claim 6 and in which circuit means is provided for impressing potential on the mains independently of the variable potential and manually operable contactor means is provided to cause the current in the mains and circuit resulting therefrom to flow in one direction or the other optionally.

References Cited in the file of this patent

UNITED STATES PATENTS

| | | |
|---|---|---|
| 1,798,592 | Davis | Mar. 31, 1931 |
| 1,994,324 | Suits | Mar. 12, 1935 |
| 2,414,936 | Edwards et al. | Jan. 28, 1947 |
| 2,518,865 | Cartotto | Aug. 16, 1950 |
| 2,571,708 | Graves | Oct. 16, 1951 |